US008027539B2

(12) United States Patent
Chen

(10) Patent No.: US 8,027,539 B2
(45) Date of Patent: Sep. 27, 2011

(54) METHOD AND APPARATUS FOR DETERMINING AN ORIENTATION OF A DOCUMENT INCLUDING KOREAN CHARACTERS

(75) Inventor: Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 930 days.

(21) Appl. No.: 12/007,524

(22) Filed: Jan. 11, 2008

(65) Prior Publication Data

US 2009/0180694 A1 Jul. 16, 2009

(51) Int. Cl.
*G06K 9/18* (2006.01)

(52) U.S. Cl. ........................................ 382/185

(58) Field of Classification Search .................. 382/185
See application file for complete search history.

(56) References Cited

U.S. PATENT DOCUMENTS 5,592,572 A * 1/1997 Le ................................ 382/289

FOREIGN PATENT DOCUMENTS

JP 11-338974 A 12/1999
JP 2006-260274 A 9/2006

OTHER PUBLICATIONS

Office Action, in corresponding foreign application, issued on Feb. 1, 2011.
Kim, et al., "Extraction and Recognition of Hangul from Scenery Images," IEICE Technical Report, (2002), pp. 65-70, vol. 102, No. 55.

* cited by examiner

*Primary Examiner* — Samir Ahmed
*Assistant Examiner* — Ruiping Li
(74) *Attorney, Agent, or Firm* — The Nath Law Group; Jerald L. Meyer; Sungyeop Chung

(57) ABSTRACT

A method and apparatus for determining an orientation of a document including Korean text are presented. A binarized pixel image is created from the document image. Contiguous pixels are grouped and labeled using a bounding box. A spanning stroke may be detected from a group of the contiguous pixels. The orientation of the document is determined by comparing counts associated with spanning strokes in the left, right, top, and bottom halves of the bounding boxes.

15 Claims, 5 Drawing Sheets

CONVERT TO BINARIZED IMAGE — S101
GROUP/LABEL CONTIGUOUS PIXELS — S102
EXCLUDE GROUP OF PIXELS — S103
DETECT LOCATIONS OF SPANING STROKES — S104
DETERMINE DOCUMENT ORIENTATION — S105

Figure 5:
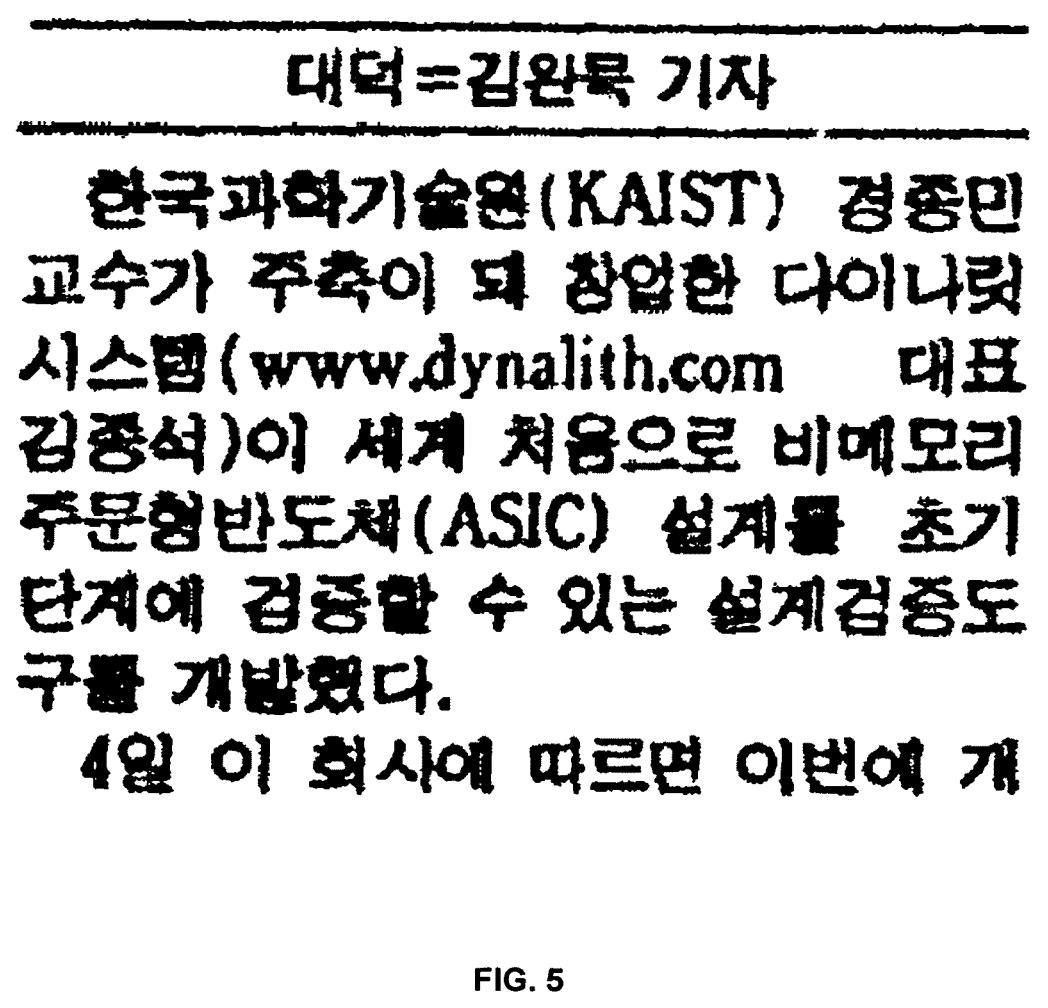

한국과학기술원(KAIST) 경종민 교수가 주축이 돼 창업한 다이나릿시스템(www.dynalith.com 대표 김종석)이 세계 처음으로 비메모리 주문형반도체(ASIC) 설계를 초기 단계에 검증할 수 있는 설계검증도구를 개발했다.

METHOD AND APPARATUS FOR DETERMINING AN ORIENTATION OF A DOCUMENT INCLUDING KOREAN CHARACTERS

BACKGROUND OF THE INVENTION

1. Field of the Invention

The present subject matter relates generally to determining an orientation of a document, and more specifically to determining an orientation of a document based on a specific feature of Korean characters included in an image of the document.

2. Related Art

When large documents must be scanned in for archiving purposes, it is quite important that all pages of the document are scanned faultlessly, since when scan errors are later detected, the original documents may no longer be available. Therefore, it is necessary to check each scan image for quality. However, checking the quality of each scanned image requires much time and effort and poses an undue burden on the personnel performing the scan job. Moreover, checking the large numbers of images is boring and error-prone.

One way of circumventing the human checking process is using an automated system that automatically checks each new scanned image and if possible corrects faulty images by relevant image processing techniques.

Conventionally, the following method has been used in order to detect the orientation (upright or inverted) of a character string. In the traditional method, character recognition is performed on the assumption that the character string is in an upright state; an evaluation value (number of points) in relation to the recognition result of each character is obtained, and an average or a like value of the evaluation values of the respective characters is calculated in order to obtain a first overall evaluation value. Subsequently, character recognition is performed on the assumption the character string is in an inverted state (rotated by 180 degrees); a second evaluation value in relation to the recognition result of each character is obtained, and an average or a like value of the respective characters is calculated in order to obtain an overall evaluation value. After this, on the basis of these two overall evaluation values, character recognition which provides a higher recognition rate is specified in order to detect whether the character string is in an upright state or in an inverted state.

Techniques that classify document script into two broad classes, Han and Latin, are disclosed in A. L. Spitz, "Determination of the Script and Language Content of Document Images," IEEE Trans PAMI, 19(3), pp 235-245, March 1997. These techniques use upward concavity and optical density to determine the script and language. However, it does not determine the orientation of the script.

Recognizing text in an image sequence is disclosed in the U.S. Pat. No. 7,031,553 issued to Myers et al. In this patent, the text orientation is identified by projecting a set of characters at different orientations and detecting the base and top lines. Projections at a fixed number of angles are used to identify the text orientation.

However, there is no disclosure about using a specific character feature of a language to determine an orientation of a document.

SUMMARY OF THE INVENTION

The present subject matter provides a method of determining an orientation of a document including Korean text and an apparatus for scanning, copying, and/or printing documents, adapted to determine the same.

According to an aspect of the subject matter, the method includes the steps of: creating a binarized pixel image from the document image; grouping and labeling contiguous pixels using a bounding box that has a predetermined size, shape and aspect ratio to bound a group of the contiguous pixels; detecting the location of a stroke that spans the width or height of the bounding box; counting the spanning strokes located in each of the left, right, top, and bottom halves of the bounding boxes; and determining the orientation of the document by comparing the counts associated with the spanning strokes detected in the left (CL), right (CR), top (CT), and bottom (CB) halves of the bounding boxes.

According to another aspect, the subject matter includes an apparatus for scanning, copying, and/or printing documents, adapted to determine an orientation of a document image that includes Korean text, comprising: means for creating a binarized pixel image from the document image; means for grouping and labeling contiguous pixels using a bounding box that has a predetermined size, shape and aspect ratio to bound a group of the contiguous pixels; means for detecting the location of a stroke that spans the width or height of the bounding box; means for counting the spanning strokes located in each of the left, right, top, and bottom halves of the bounding boxes; and means for determining the orientation of the document by comparing the counts associated with the spanning strokes detected in the left (CL), right (CR), top (CT), and bottom (CB) halves of the bounding boxes.

According to a further aspect, the subject matter includes a method of determining an orientation of a document image including Korean text, comprising the steps of: creating a binarized pixel image from the document image; detecting a text line and breaking the line into individual characters by estimating the character widths;

generating a bounding box around a character; detecting the location of a stroke that spans the width or height of the bounding box; counting the spanning strokes located in each of the left, right, top, and bottom halves of the bounding boxes; and determining the orientation of the document by comparing the counts associated with the spanning strokes detected in the left (CL), right (CR), top (CT), and bottom (CB) halves of the bounding boxes.

BRIEF DESCRIPTION OF THE DRAWINGS

These and other aspects of the subject matter will be apparent with reference to the examples in the following description and with reference to the accompanying drawings, wherein FIG. 1 shows an example of Hangul characters.

FIG. 5 illustrates a portion of a Korean document with text containing vertical and horizontal spanning strokes.

DETAILED DESCRIPTION OF THE INVENTION

Figure 2:
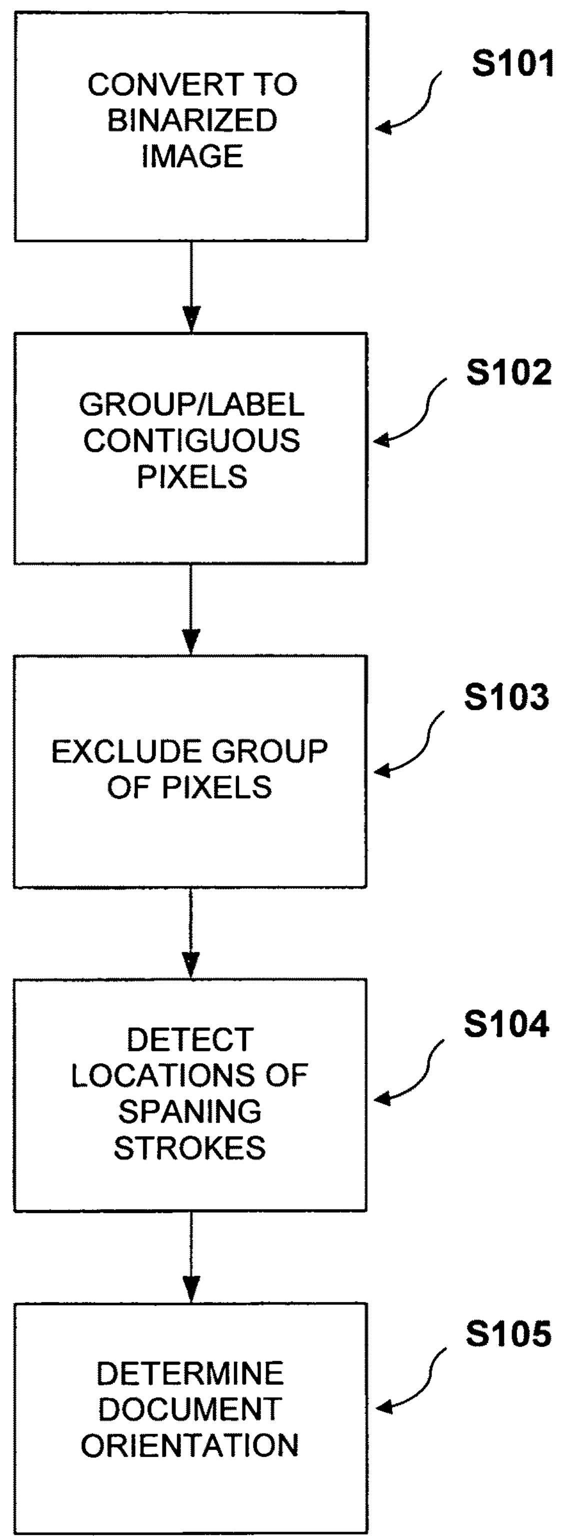
FIG. 2 shows a block diagram of steps for implementing determination of document orientation according to an embodiment of the present subject matter.

The Figures are diagrammatic and not drawn to scale. In the Figures, elements which correspond to elements already described have the same reference numerals.

Figure 1:
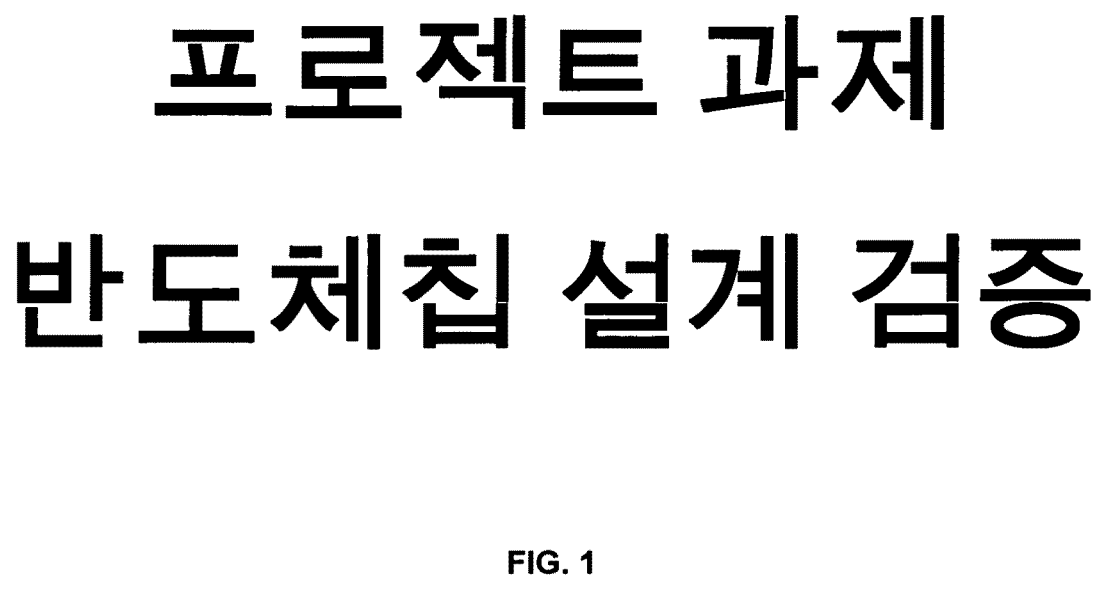

FIG. 1 shows an example of Korean characters, i.e. Hangul characters.

In this example, Hangul characters are arranged in two lines, each of which has several characters. Each Hangul character is a combination of at least a consonant and a vowel. For example, the first character from the left in the first line is "프", which includes one consonant "ㅍ" and one vowel "ㅡ."

Six Hangul characters are in the first line, among which five characters have strokes spanning their height or width. Three characters, "프", "로", and "트", respectively have strokes spanning the width of each character, i.e. "ㅡ", "ㅗ", and "ㅡ" while two characters, "과" and "제" respectively have strokes spanning the height of each character, i.e. "ㅏ" and "ㅔ." Eight Hangul characters form the second line, among which four characters have strokes spanning their height or width. Two characters, "도" and "증", respectively have strokes spanning the width of each character, i.e. "ㅗ", and "ㅡ", while two characters, "체" and "계", respectively have strokes spanning the height of each character, i.e. "ㅔ" and "ㅖ."

It should be noted that, in Hangul, a stroke spanning a character height (hereinafter, "vertical spanning stroke") must be found in the right half of the character. In this example, "ㅏ" of "과", "ㅔ" of "제", "ㅔ" of "체" and "ㅖ." of "계", are found in the right half of the character. Unlike the vertical spanning stroke, a stroke spanning a character width (hereinafter, "horizontal spanning stroke") can be found in either top or bottom half of the character. In this example, "ㅡ" of "프", "ㅗ" of "로", "ㅡ" of "트", "ㅗ" of "도", and "ㅡ" of "증", are found in either top or bottom half of the character (in this example, "ㅡ" is found in the top half of "증", while "ㅡ", "ㅗ", and "ㅗ" are respectively found in the bottom halves of "프", "로", "트", and "도").

Accordingly, if a document having Hangul text is in an upright direction (0□), the vertical spanning strokes are not found in the left halves of the characters but the right halves. However, if the document is skew, for example, 90° or 270°, the spanning strokes can be found both in the left and right halves of the characters. This is because the left and right halves of the characters in the skewed document would correspond to the top and bottom halves or the bottom and top halves of the characters if the document were in an upright direction. Similarly, if the document is in an invert direction, i.e. 180□, the spanning strokes are not found in the right halves of the characters but the left halves because, in an inverted situation, the left and right halves would be respectively the right and left halves if the document were in an upright direction.

FIG. 2 shows a block diagram of steps for implementing determination of a document orientation according to an embodiment of the present subject matter.

Figure 3:
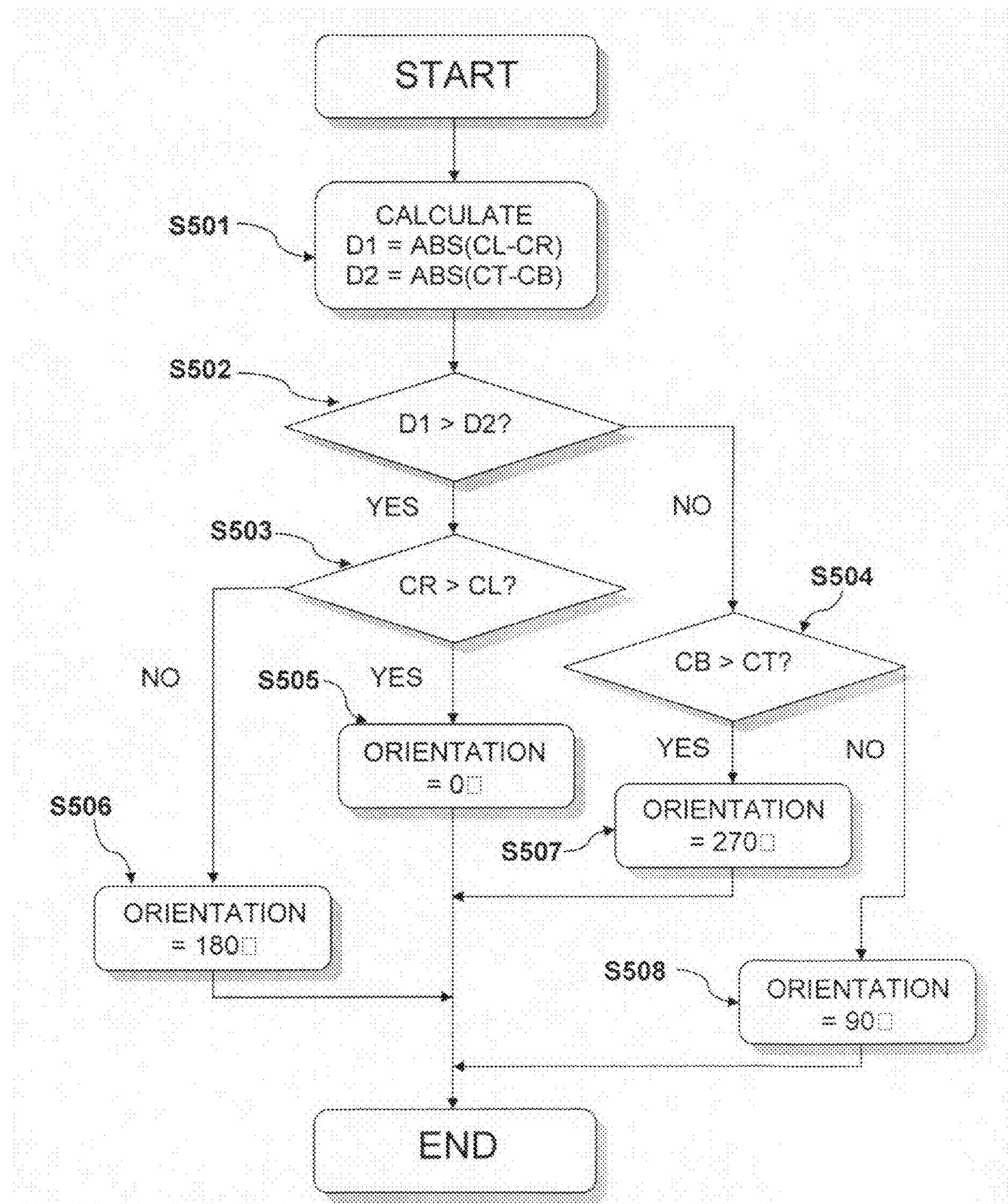
FIG. 3 shows an algorithm for determining the orientation of the document at Step S105 in FIG. 2.

In this embodiment, the determination of an orientation of a document is performed through Steps S101, S102, S103, S104, and S105. In Step S101, a document is scanned and converted to a binarized image. The binarized image is comprised of pixel images each having one of two values (FIG. 3). If the document image contains more than one color channel, it is converted to grayscale. The grayscale image may be smoothed by a smoothing filter. Eventually, the grayscale image may be converted to a binarized image by means of, for example, thresholding.

In Step S102, contiguous pixels in the binarized image are grouped and labeled along with properties such as bounding boxes, each of which is provided for encompassing a group of the contiguous pixels. This group of the contiguous pixels may correspond to a Hangul character. The document image may be assumed to be scanned at one of the four cardinal angles, namely 0°, 90°, 180°, and 270° with respect to one paper edge or the primary text line direction. If this assumption is not met, skew should be determined.

In Step S103, if at least a part of the pixels in the binarized image are located outside the bounding box, the corresponding group of the contiguous pixels may be excluded from the document orientation determining procedure. If no pixel in a group of the contiguous pixels is located outside the bounding box, the group of the pixels are retained and considered as a component in the determining procedure. It may be understood that Step S103 is optional.

In Step S104, the retained groups of the pixels are analyzed to detect the locations of spanning strokes. The location of a spanning stroke detected from a Hangul character should be one of the followings: the top, bottom, right, and left halves of each bounding box. Step S104 may be implemented by projecting the binarized character image horizontally and vertically to form projection histograms, and subsequently finding peaks in the histograms that span at least a certain percentage. The peaks in the histograms are considered as the spanning strokes in Hangul characters. Whenever a spanning stroke is detected, a respective counter corresponding to the location of the spanning stroke in the bounding box is incremented.

In Step S105, the orientation of the document is determined. The peak counts for the left, right, top, and bottom halves of the character bounding box are used to determine the orientation. Four counters, i.e. left, right, top, and bottom counters (CL, CR, CT, and CB, respectively), may be used for this purpose. For an upright document, the difference between CL and CR should be larger than that between CT and CB, and CR must be larger than CL.

FIG. 3 shows an algorithm for determining the orientation of the document at Step S105 in FIG. 2. Once the counts for the left, right, top, and bottom halves of the bounding box have been acquired, the calculation of values D1 and D2 is implemented (S501). In the equations shown in Step S501, D1=ABS(CL−CR) is the absolute value of CL−CR and D2=ABS(CT−CB) is the absolute value of CT−CB. With the values of D1 and D2 acquired from Step S501, comparison between D1 and D2 is implemented (S502). If the value of D1 is larger than D2, i.e. D1>D2, then comparison between CR and CL is implemented (S503). Here, if the CR is larger than CL, i.e. CR>CL, in Step S503, then the orientation of the document is determined to be an upright, i.e. 0° (S505). On the other hand, if the CR is not larger than CL, i.e. CR≦CL, in Step S503, the orientation of the document is determined to be 180° (S506). If D1 is not larger than D2, i.e. D1≦D2, in Step S502, comparison between CB and CT is performed (S504). If CB is larger than CT, i.e. CB>CT, the orientation of the document is determined to be 270° (S507). On the other hand, if CB is not larger than CT, i.e. CB≦CT, in Step S504, the orientation of the document is determined to be 90° (S508).

Steps shown in FIG. 2 and FIG. 3 may be implemented by, for example, a microprocessor used in a printer, scanner, copier, multi-function printer, etc. To that end, the present subject matter is also directed to an apparatus for scanning, copying, and/or printing documents, adapted to determine an orientation of a document image that includes Korean text. In this aspect, the apparatus includes means for creating a binarized pixel image from the document image; means for grouping and labeling contiguous pixels using a bounding box that has a predetermined size, shape and aspect ratio to bound a group of the contiguous pixels; means for detecting the location of a stroke that spans the width or height of the bounding box; means for counting the spanning strokes located in each of the left, right, top, and bottom halves of the bounding boxes; and means for determining the orientation of the document by comparing the counts associated with the spanning strokes detected in the left (CL), right (CR), top (CT), and bottom (CB) halves of the bounding boxes. As indicated above, the various means for doing the required functions may include one or more microprocessors and/or computers with instructions to implement the various functions. Other such means are also contemplated within the scope of the present subject matter.

Figure 4:
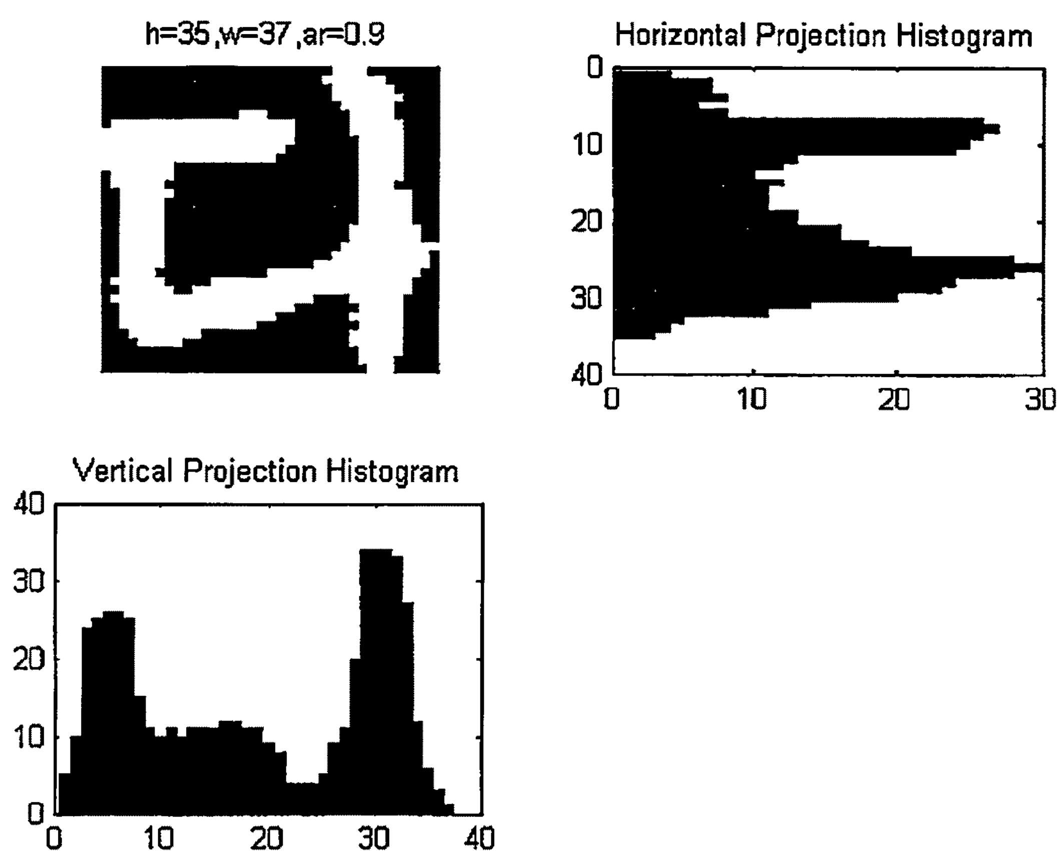
FIG. 4 shows a binarized image of a Hangul character and horizontal and vertical projection histograms.

FIG. 4 shows a binarized image of a Hangul character and horizontal and vertical projection histograms. The top left shows the binarized image of Hangul character "다." Here, "ㅏ" is a stroke spanning the height of the bounding box (the square encompassing the character image). The bottom left shows a vertical projection histogram in which the horizontal axis represents the horizontal location of projection lines for the binarized character image of "다" and the vertical axis indicates the number of pixels detected. The top right shows a horizontal projection histogram in which the horizontal axis represents the number of pixels detected and the vertical axis indicates vertical locations of projection lines for the binarized image.

In FIG. 4, neither peak in the horizontal projection histogram meets the criteria to be a spanning stroke: the peak must span a certain percentage in the histogram, whereas the peak on the right side in the vertical projection histogram meets the criteria, thereby causing the right counter CR to be incremented.

FIG. 5 illustrates a portion of a Korean document with text containing vertical and horizontal spanning strokes. It should be noted that in some characters where the consonants and vowels are isolated, the characters are treated as separated components and excluded from grouping and labeling as described above. As an alternative, in order to avoid a character where the parts of the character are completely disjointed from being treated as a separate component, detecting text lines and breaking up them into individual characters by estimating the character widths, rather than the grouping and labeling, may be provided. A further alternative is to generate a bounding box around the character even if the character disjoints the box. In this respect, the subject matter is also directed to a method of determining an orientation of a document image including Korean text, wherein a text line is detected and broken into individual characters by estimating the character widths, a bounding box around a character is generated, the location of a stroke that spans the width or height of the bounding box is detected, the spanning strokes located in each of the left, right, top, and bottom halves of the bounding boxes are counted, and the orientation of the document is determined by comparing the counts associated with the spanning strokes detected in the left (CL), right (CR), top (CT), and bottom (CB) halves of the bounding boxes.

The embodiments of the subject matter may be used for a document containing the text line direction that is parallel to one of the page edges. Furthermore, the embodiments of the subject matter may be applied to the printed text with a certain amount of characters.

The embodiments of the subject matter may be used in a scanner, copier, or multi-function printer (MFP), specifically, for example, in software that runs on the computer, or in firmware that resides in the MFP.

The subject matter being thus described, it will be obvious that the same may be varied in many ways. Such variations are not to be regarded as a departure from the spirit and scope of the subject matter, and all such modifications as would be obvious to one skilled in the art are intended to be included within the scope of the following claims.

What is claimed is:

1. A method of determining an orientation of a document image including Korean text, comprising the steps of:

creating a binarized pixel image from the document image;

grouping and labeling contiguous pixels using a bounding box that has a predetermined size, shape and aspect ratio to bound a group of the contiguous pixels;

detecting the location of a stroke that spans the width or height of the bounding box, wherein the spanning stroke includes the group of contiguous pixels that is a part of a character;

counting the spanning strokes located in each of the left, right, top, and bottom halves of the bounding boxes; and determining the orientation of the document by comparing the counts associated with the spanning strokes detected in the left (CL), right (CR), top (CT), and bottom (CB) halves of the bounding boxes.

2. The method according to claim 1, wherein, in the determining step, the orientation of the document is determined to be upright (0°) if CR is larger than CL, and the absolute value of CR−CL is larger than the absolute value of CB−CT.

3. The method according to claim 1, wherein, in the determining step, the orientation of the document is determined to be 180° if CR is equal to or smaller than CL, and the absolute value of CR−CL is larger than the absolute value of CB−CT.

4. The method according to claim 1, wherein, in the determining step, the orientation of the document is determined to be 270° if CB is larger than CT, and the absolute value of CR−CL is equal to or smaller than the absolute value of CB−CT.

5. The method according to claim 1, wherein, in the determining step, the orientation of the document is determined to be 90° if CB is equal to or smaller than CT, and the absolute value of CR−CL is equal to or smaller than the absolute value of CB−CT.

6. The method according to claim 1, the method further comprises the step of excluding a group of contiguous pixels if at least a part of them are located outside the bounding box.

7. The method according to claim 6, wherein, in the detecting step, the location of the spanning stroke is detected when the number of pixels at a horizontal or vertical location of the bounding box is larger than a predetermined value.

8. The method according to claim 7, the number of pixels at the horizontal or vertical location of the bounding box is determined using a horizontal or vertical projection histogram.

9. An apparatus for scanning, copying, and/or printing documents, adapted to determine an orientation of a document image that includes Korean text, comprising:

means for creating a binarized pixel image from the document image;

means for grouping and labeling contiguous pixels using a bounding box that has a predetermined size, shape and aspect ratio to bound a group of the contiguous pixels;

means for detecting the location of a stroke that spans the width or height of the bounding box, wherein the spanning stroke includes the group of contiguous pixels that is a part of a character;

means for counting the spanning strokes located in each of the left, right, top, and bottom halves of the bounding boxes; and means for determining the orientation of the document by comparing the counts associated with the spanning strokes detected in the left (CL), right (CR), top (CT), and bottom (CB) halves of the bounding boxes.

10. The apparatus according to claim 9, wherein the orientation of the document is determined to be upright (0°) if CR is larger than CL, and the absolute value of CR−CL is larger than the absolute value of CB−CT.

11. The apparatus according to claim 9, further including means for implementing excluding a group of contiguous pixels if at least a part of them are located outside the bounding box.

12. The apparatus according to claim 11, wherein the means for detecting detects the location of the spanning stroke when the number of pixels at a horizontal or vertical location of the bounding box is larger than a predetermined value.

13. The apparatus according to claim 12, wherein the number of pixels at the horizontal or vertical location of the bounding box is determined using a horizontal or vertical projection histogram.

14. A method of determining an orientation of a document image including Korean text, comprising the steps of:

creating a binarized pixel image from the document image;

detecting a text line and breaking the line into individual characters by estimating the character widths;

generating a bounding box around a character;

detecting the location of a stroke that spans the width or height of the bounding box, wherein the spanning stroke includes the group of contiguous pixels that is a part of the character;

counting the spanning strokes located in each of the left, right, top, and bottom halves of the bounding boxes; and determining the orientation of the document by comparing the counts associated with the spanning strokes detected in the left (CL), right (CR), top (CT), and bottom (CB) halves of the bounding boxes.

15. The method according to claim 14, wherein, in the determining step, the orientation of the document is determined to be upright (0°) if CR is larger than CL, and the absolute value of CL is larger than the absolute value of CT.

* * * * *